Nov. 29, 1955      J. F. MARTIN      2,725,131
MOTOR ACTUATED EMERGENCY BRAKE

Filed July 20, 1954      2 Sheets-Sheet 1

INVENTOR.
JOSEPH F. MARTIN

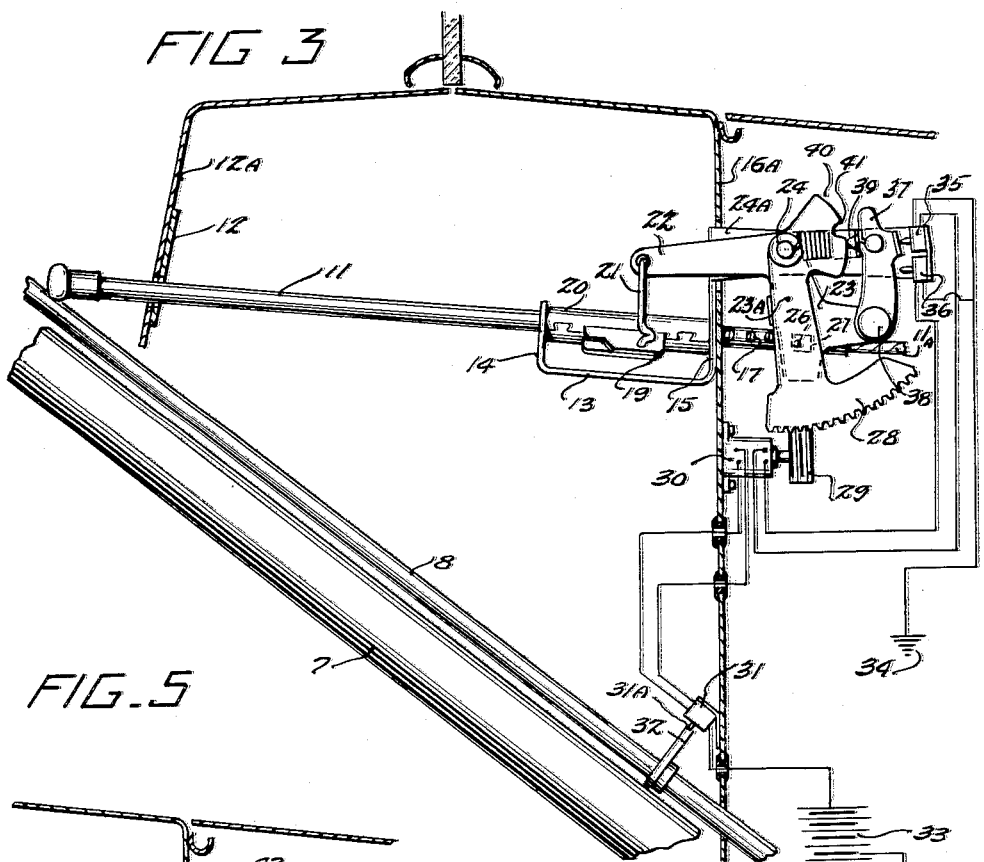
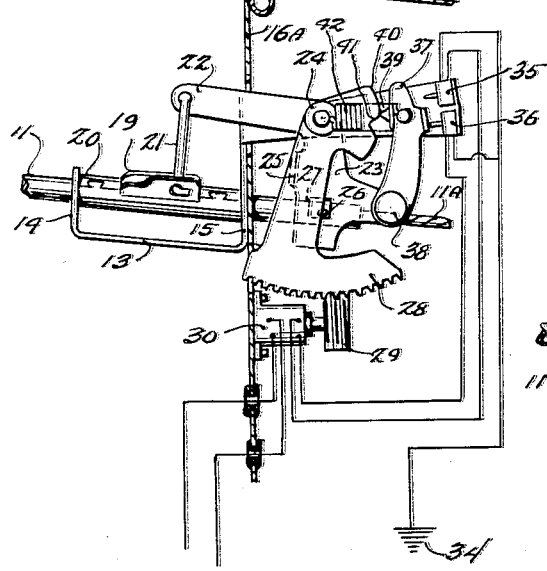
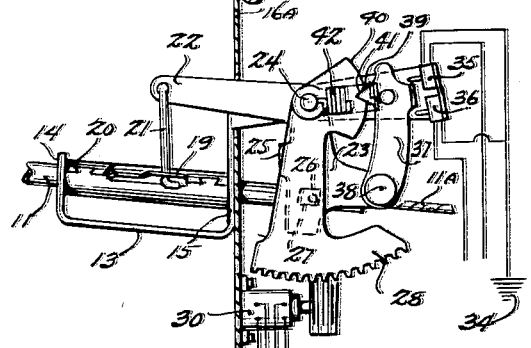

United States Patent Office 2,725,131
Patented Nov. 29, 1955

2,725,131

MOTOR ACTUATED EMERGENCY BRAKE

Joseph F. Martin, Detroit, Mich.

Application July 20, 1954, Serial No. 444,445

6 Claims. (Cl. 192—4)

This invention relates to automotive devices, and has particular reference to a device for automatically engaging and releasing the emergency brake of a motor vehicle.

An object of the invention is to generally improve devices such as disclosed in Patent No. 2,656,025, issued to me on October 20, 1953, and devices such as disclosed in my co-pending application, Serial No. 444,442, filed July 20, 1954, of which this may be considered a continuation in part.

Another object of the invention is to provide an automatic motor actuated mechanism for engaging and disengaging the emergency brake, which mechanism may readily be installed on old or new motor vehicles such as are equipped with a conventional emergency brake mechanism, and a gear shift lever or automatic transmission.

Another object of the invention is to provide automatic motor actuated means for engaging and disengaging the emergency brake simultaneously with the changing of the position of the transmission speed selector mechanism or the conventional gear shift lever positioned on the steering column.

Another object of the invention is to provide automatic motor actuated means for engaging and disengaging the emergency brake mechansim, which power means are controlled by the manual operation of selecting a predetermined position on the automatic transmission mechanism without in any way interfering with the normal functioning of the automatic transmission.

Another object of the invention is to provide automatic power means for engaging and disengaging the emergency brake with flexible means for controlling the same.

The foregoing and other objects and advantages of the invention will become more apparent as the description proceeds, reference being made from time to time to the accompanying drawing, forming part of the within disclosure, in which drawing:

Fig. 3 is a fragmentary vertical section taken through a vehicle body showing the hand brake steering column, speed selector lever and emergency brake motor drive, mounted in position on the fire wall and instrument panel of the device.

Fig. 4 is a side elevational view of the flexible control mechanism while in driving position.

Fig. 5 is a view similar to that shown in Fig. 4, but showing the flexible control mechanism in the position assumed after setting the brake and shutting off the motor drive.

Figure 1:
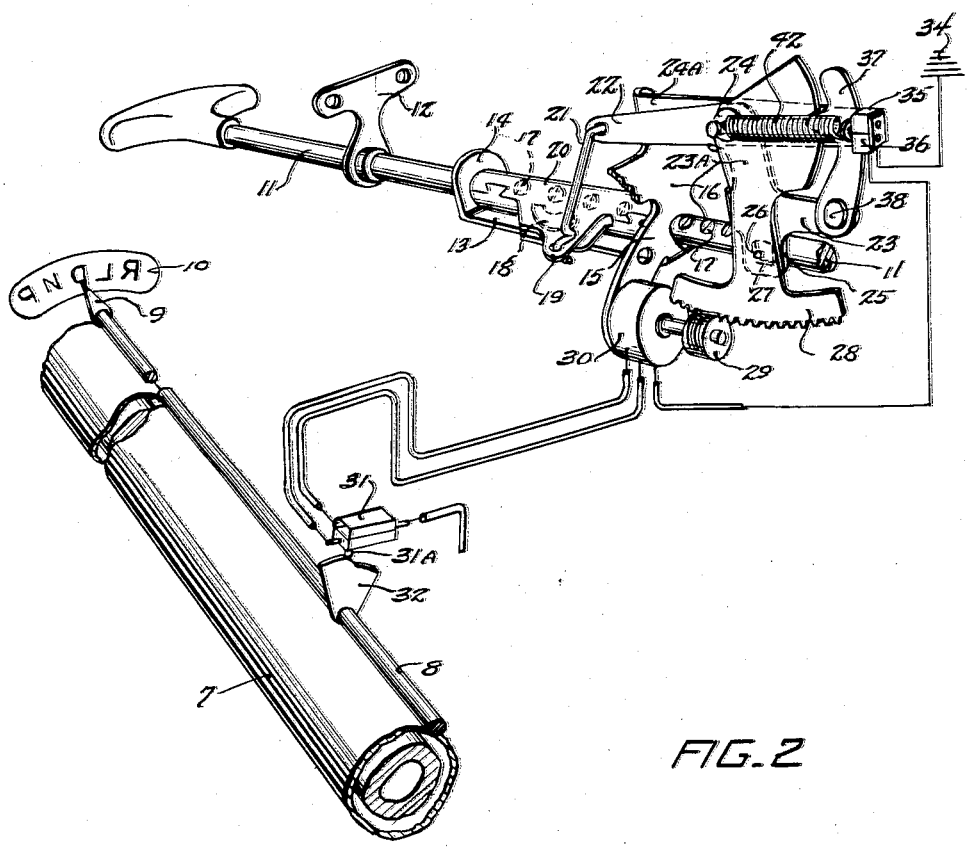
Fig. 1 is a perspective view of a mechanism embodying the invention and illustrating the power operated elements in relation to the hand brake rod, the vehicle steering column and the speed selector mechanism of a vehicle having an automatic transmission.

Referring now more particularly to the drawing, it will be understood that in the embodiment herein disclosed, the reference character 7 indicates the steering column of a motor vehicle having an automatic transmission which is controlled by means of the speed selector rod 8, which is provided with an indicator 9 arranged to indicate on the speed selector panel 10 the gear changes and speeds within the range of the automatic transmission. The reference character 11 indicates the emergency brake hand rod which is connected to the emergency brake pull cable 11A (Figs. 3, 4, and 5) and which is normally urged into released position by means of a spring (not shown) which comprise parts of the conventional emergency brake mechanism of the motor vehicle. The rod 11 is supported at the front by means of a bearing bracket 12 which is preferably secured to the rear of the instrument panel 12A (Fig. 3) of the motor vehicle and the rod 11 is supported at the rear by means of the cradle 13 having end bearing members 14 and 15. The cradle 13 has an extension member 16 whereby it is secured to the driver's side of the fire wall 16A (Fig. 3) of the vehicle body. Machined on the rod 11 is a plurality of ratchet teeth 17 which are arranged to be engaged by a locking pawl 18, which is spring backed and is pivoted in the pawl supporting member 19, which is formed integrally with the sleeve 20, which is arranged to rotate about the rod 11 and which is held against endwise movement on the rod 11 by means of the end bearing members 14 and 15. The pawl carrying member 19 is connected by means of a link 21 to the upper end 22 of a bell crank 23, which is pivoted, as at 24, to an extension 24A formed on the member 16. The bell crank 23 has a yoke portion 25 through which is extended the rod 11 and to which it is connected by means of a pin 26 which engages the slot 27 formed in the yoke portion 25.

Also pivoted, at 24, is an arm 23A which terminates at its lower end in a toothed segment 28 which engages a worm gear 29 mounted for rotation on the shaft of a reversible motor 30, which is actuated by a double throw microswitch 31, which is operated by a cam plate 32 mounted on the gear selector rod 8 and moves therewith. The switch 31 and the motor 30 are positioned in an electric circuit 34. The reversible motor 30, through the segment 28, moves the locking pawl 18 into and out of engagement with the teeth 17 and sets and releases the emergency brake through the movement of the rod 11.

In my co-pending application, the power driving mechanisms for setting and releasing the emergency brake have no fixed stopping positions, and the power of the brake actuating means is balanced by the power when the brakes are set. In this motor driven power mechansim, however, it is necessary to provide a flexible means for controlling the limit switches since the latter are fixed in position and the position at which the braking action terminates will vary. In order to accomplish this action, I provide a pair of normally closed microswitches 35 and 36, which are opened and closed by means of a switch arm 37 which is pivoted, as at 38, on an extension of the bell crank 23. The arm 37 has a pawl 39 which rides on a cam 40 formed on an extension on the arm 23A. The cam 40 is provided with a notch 41, which is engaged by the pawl 39 during the time the parts are in the driving position. This permits the arm 37 to be moved out of contact with the limit switches 35 and 36 under the influence of a spring 42.

Figure 2:
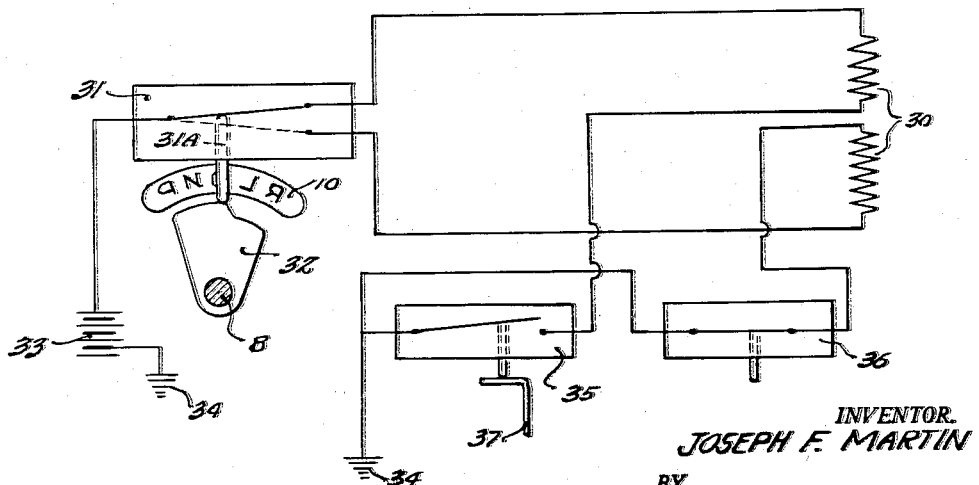
Fig. 2 is a diagrammatic view illustrating the circuits and controls employed in the structure illustrated in Fig. 1.

The device functions as follows:

When the indicator 9 is set to indicate "D" for "Drive," the mechanism will be in the position shown in Fig. 1. In this position, the emergency brake rod 11 is free of the locking pawl 18 and the emergency brakes are released. The parts will remain in the position shown in Fig. 1 should the selector 9 also be moved to indicate "L" for "Low" or "R" for "Reverse" because the movement of the cam plate 32 to the right will not affect the switch 31 as illustrated in Fig. 2. The motor 30 would continue to rotate were it not for the limit switch 35 which is actuated by the arm 37 as shown in Figs. 2 and 3.

When the indicator 9 is moved to the position "N" for "Neutral," the switch plunger 31A will fall on the lower surface of the cam plate 32, causing the contact member of the switch 31 to move to the position shown by the dotted line in Fig. 2. This reverses the flow of current to the motor 30, causing the rotation of the motor in the opposite direction and moving the segment 28 towards the position shown in Fig. 5. During the movement of the segment 28 towards the position shown in Fig. 5, the pawl carrying member 19 will be elevated so that the pawl 18 is brought into alignment with the ratchet teeth 17 and during the same movement of the segment 28 the rod 11 will be moved to the left under the influence of the pin 26 which engages the slot 27 in the bell crank 23. The movement of the segment 28 will continue until the pawl 39 rides out of the cam slot 41 as shown in Fig. 5, causing the arm 37 to contact the limit switch 36 causing it to open, interrupting the circuit. This will stop the motor 30 and hold the emergency brake in engaged position. The emergency brake will remain in engaged position until the seelctor 9 is again moved to the driving position as shown in Fig. 1.

Having described my invention, what I claim and desire to secure by Letters Patent is:

1. In a motor vehicle having an emergency brake mechanism, including a push-pull rod having ratchet teeth thereon, and a speed selector mechanism, including a speed selector indicator and rod, the combination of, a bracket for supporting said push-pull rod, a sleeve rotatable on said push-pull rod, a spring backed pawl carried on an extension formed on said sleeve and alignable with said ratchet teeth, a bell crank, one arm of said bell crank having linkage connected to said sleeve and arranged to move said pawl into and out of alignment with said ratchet teeth, a member pivoted on the same axis with said bell crank and having a gear segment in engagement with a worm gear rotatably mounted on the shaft of a reversible electric motor, an electric circuit for said motor, a switch in said circuit for actuating and reversing said motor, a cam plate carried by the selector rod of said speed selector mechanism for actuating said switch, and a yoke on said bell crank and connected to said push-pull rod.

2. The structure of claim 1, including a pair of limit switches in said electric circuit, and a spring backed arm pivoted to said bell crank and arranged to actuate said limit switches.

3. The structure of claim 1, including a pair of limit switches in said electric circuit, and a spring backed arm pivoted to said bell crank and arranged to actuate said limit switches, and a cam member formed on said member pivoted on the same axis with said bell crank, said cam being arranged to hold said spring backed arm out of contact with said limit switches during a portion of the travel of said bell crank and arranged to move said arm into contacting position with said limit switches during other portions of the travel of said bell crank.

4. The structure of claim 1, in which said pawl is held out of engagement with said ratchet teeth by said bell crank when the indicator of said speed selector mechanism is in driving position, and said pawl is held in alignment with said ratchet teeth by said bell crank when said indicator is in neutral or parking position.

5. The structure of claim 1, in which said reversible electric motor is connected to the electrical system of said motor vehicle.

6. The structure of claim 1, in which the connection between said bell crank and said push-pull rod consists of a pin through said rod which is engageable with a slot formed in said yoke.

References Cited in the file of this patent
UNITED STATES PATENTS

| | | |
|---|---|---|
| 2,059,069 | Weiss | Oct. 27, 1936 |
| 2,251,787 | Gardiner | Aug. 5, 1941 |